United States Patent [19]

Flegel et al.

[11] 3,810,597

[45] May 14, 1974

[54] LAVATORY CARRIER BRACKET AND SUPPORT

[75] Inventors: George J. Flegel; Nicholas G. Scheuer, both of Michigan City, Ind.

[73] Assignee: Josam Manufacturing Co., Michigan City, Ind.

[22] Filed: May 5, 1972

[21] Appl. No.: 250,575

[52] U.S. Cl. .................................. 248/214, 4/170
[51] Int. Cl. ............................................. F16b 1/00
[58] Field of Search............ 248/205 R, 214, 14, 16; 52/34, 35; 4/170

[56] References Cited
UNITED STATES PATENTS

| | | | |
|---|---|---|---|
| 2,903,712 | 9/1959 | Morris et al. | 4/170 |
| 2,165,689 | 7/1939 | Trippe | 248/214 X |
| 3,494,584 | 2/1970 | Dubey | 248/221 |
| 2,810,917 | 10/1957 | Rhoades | 4/170 |
| 1,098,546 | 11/1913 | McCarty | 4/170 UX |
| 2,035,301 | 3/1936 | Daugherty | 4/170 UX |
| 2,819,473 | 1/1958 | Baker et al. | 4/170 |

Primary Examiner—J. Franklin Foss
Attorney, Agent, or Firm—Philip D. Golrick

[57] ABSTRACT

To mount an array of lavatory and other sanitary or plumbing fixtures each requiring a pair of carrier arms or other wall mounted support elements, a horizontally elongated support plate rigid in the wall, and a bracket assembly for each element comprising a front bracket plate casting and rear plate clamped on the support plate therebetween by upper and lower clamp bolts. On the flat casting back, to either side of a top bolt aperture, an interrupted lip engages the support plate top edge, spacing the top bolt from shearing engagement; the casting having at least one further threaded aperture receiving threaded lavatory support mounting means, and plural locations adapted for tapping to receive mounting bolts of diverse lavatory support elements. Thus assemblies are easily clamped in proper adjusted positioning and spacing along the support plate for mounting different fixtures with diverse support elements.

8 Claims, 5 Drawing Figures

PATENTED MAY 14 1974  3,810,597
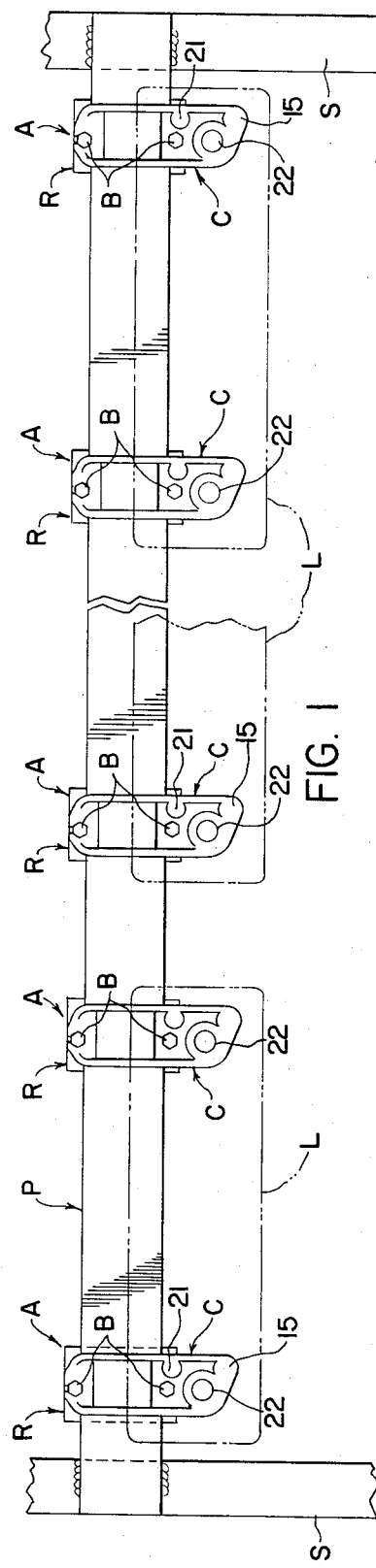
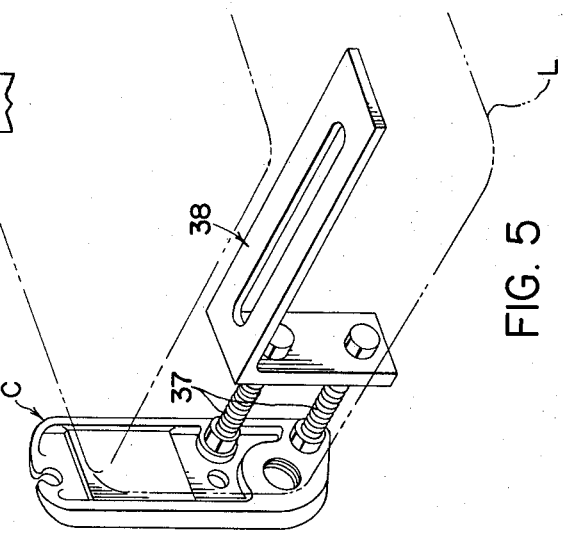
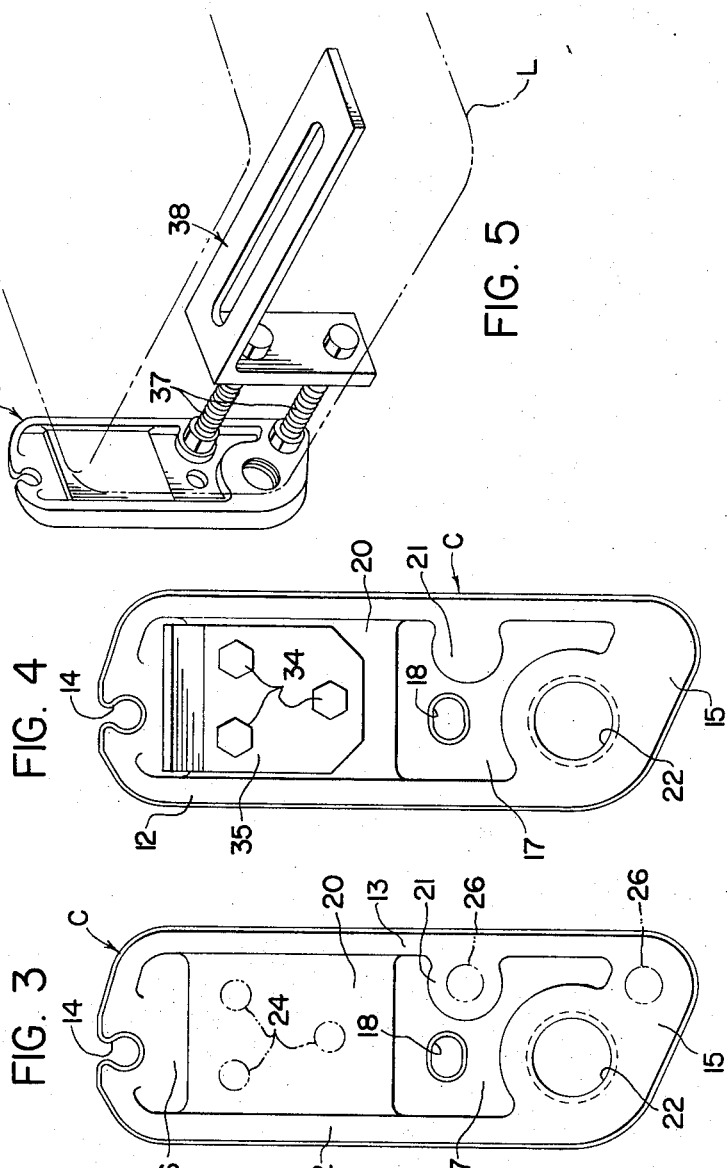
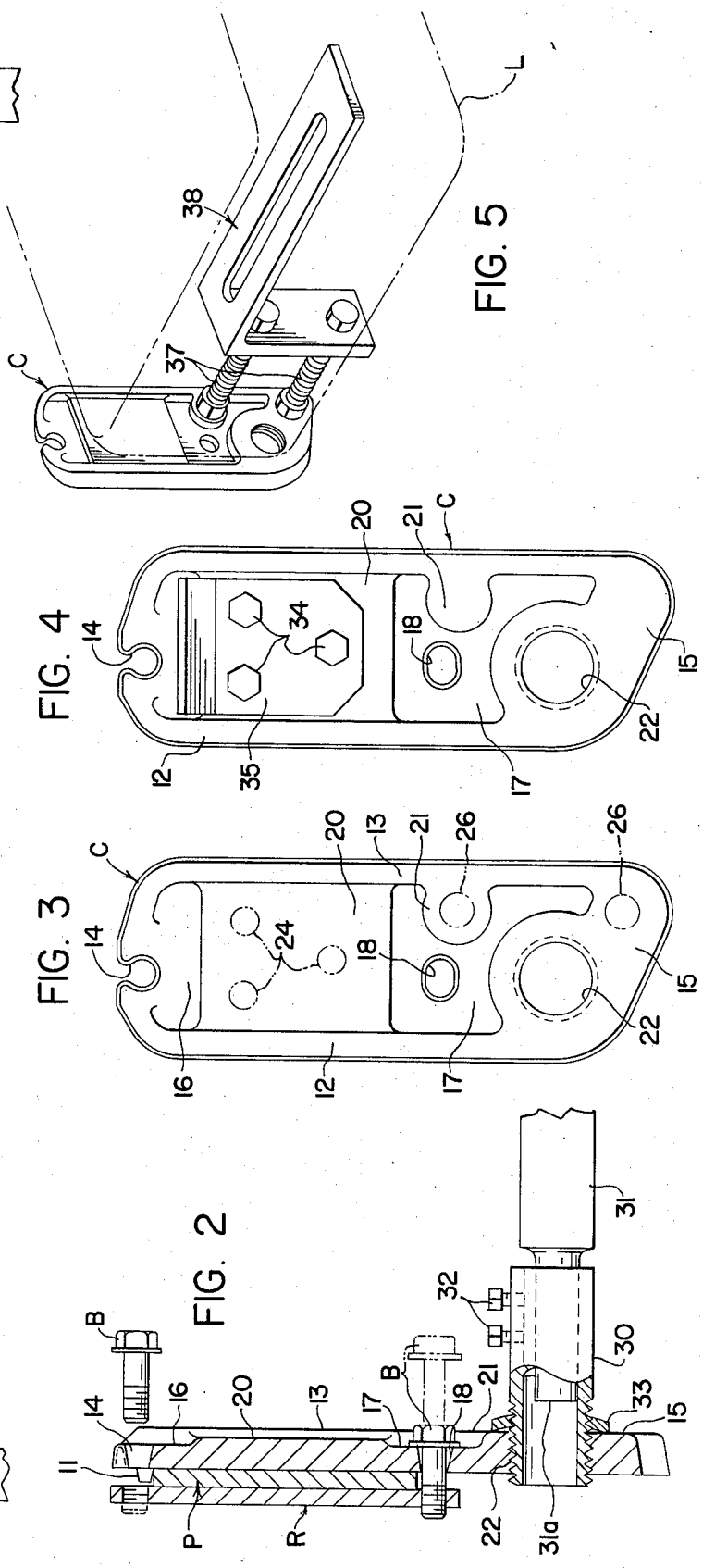

LAVATORY CARRIER BRACKET AND SUPPORT

Where several plumbing fixtures such as sinks or lavatories or urinals or other fixtures are to be mounted along a wall, because of soaring labor costs it is obviously advantageous and highly desirable to be able to mount the fixtures securely and properly spaced with a minimum of labor in the overall production of the finished installation.

For this reason there has been some degree of standardization among fixture manufacturers respecting sizes and adaption of fixtures for support by particular types of support structures, such as concealed or exposed carrier arms or hangers; and the latter also have been developed and improved to decrease the labor and other costs involved in installing the fixtures on such elements once they are in place. However, the securement of the support elements on or in the walls has entailed considerable labor, especially where several such fixtures are to be installed in a single array.

For smaller installations of one or two fixtures, there have been produced brackets or plates to be installed within the wall, mounted on studding in frame construction or secured within masonry walls; the bracket assemblies or plates having fixed anchor formations for attachment of fixture support elements, or a multiplicity of holes providing some degree of selectability in locating and securing fixture support elements or anchors or bases therefor; but these have suffered disadvantages either in limited adjustability or in difficulty of installation with the anchor points at precise location, and in general have not been too well suited for use where several fixtures are to be installed.

Consequently there have been attempts to minimize costs through application of factory production methods by pre-fabricating so-called plumbing walls, wherein to a greater or lesser extent in a unitary steel frame assembly brought to a job site to be incorporated in a building wall, there would be already provided a horizontally elongated steel plate with tapped holes or welded-on nuts to receive and anchor the fixture support elements to be used, and water supply and drainage lines terminated at points in proper relation thereto for respective fixture connections. But here the entailed machining and welding operations thus are carried out on large plate components requiring extensive layout and/or jigging with considerable variation among different installations, representing labor costs desirably to be eliminated or minimized if possible.

The present invention provides a simple bracket assembly adapted to be readily clamped on an elongated rigid steel support plate within a wall at precisely selected position, so that pairs of brackets are appropriately located both in spacing within each pair and in inter-pair spacing as required for the installation. The assembly includes a standard front bracket plate casting on which a fixture support element is anchored, a rear clamping plate, and a pair of vertically spaced bolts through the bracket into threaded rear plate apertures to secure the assembly clamped on the support plate clamped therebetween. At the bracket plate top region an integral lip formation projects sufficiently to engage the support plate top edge without interference by the rear plate, so that the lip communicates the load to the plate edge rather than subjecting the top bolt to shear. The lip also facilitates assembly to and precise positioning on the support plate.

The bracket plate as cast is simply provided with the basic structure of lip, clamping bolt holes, pad-like front flat areas for tapped holes for exposed arm mounting studs, or for hanger element anchoring bolts, and is cast, in a lower projecting portion, with a large aperture to be threaded for a concealed arm mounting nipple-like sleeve. Since the clamp bolts, rear plate, and basic front plate casting, as thus far described, are identical for all applications, these are easily and cheaply produced by low cost mass production techniques; and the bracket castings then require only the tapping of holes at the locations provided for the three principal or standard types of lavatory or like fixture supports, again carried out on a factory operation basis. Thus the assemblies can be produced at very low cost, and easily and quickly assembled on a rigid support plate, whether in a so-called plumbing wall or in other wall structure, to provide rigid secure mounting for the fixture support elements, hence ultimately the fixture, at the precise desired locations.

The general object of the present invention is then to provide means for secure support of lavatory and like plumbing fixtures on a room wall in proper location, at an overall lower cost.

Another object is to provide bracket assemblies easily assembled to a within-the-wall support plate in proper locations for receiving fixture supporting elements on respective assemblies. Another object is to provide a fixture support mounting bracket assembly which in basic structure is adapted to be used for each of a plurality of common fixture supports.

Other objects and advantages will appear from the following description of a particular embodiment and the drawings thereof, wherein:

FIG. 1 is a fragmentary front view of an unfinished wall area, of say a washroom, where an array of several lavatories is to be installed by means including bracket assemblies as provided by the present invention;

FIG. 2 is an enlarged vertical section through one bracket assembly and also fragmentarily showing one form of lavatory support element, a concealed arm type, mounted thereon;

FIG. 3 is a front elevational view of the front bracket plate casting of the assembly;

FIG. 4 is a view similar to FIG. 3, but showing also a lavatory hanger element attached to the bracket plate;

FIG. 5 shows a bracket plate with a still further type of lavatory support, an exposed arm, attached thereto.

In FIG. 1 the basic components of the within-the-wall structure for practice of the present invention are represented as a horizontally extended rigid support plate P, secured rigidly on vertical members S and carrying several pairs of bracket assemblies A; each pair positioned at the intended location of a lavatory fixture, indicated in dashed outline at L; the assembly of each pair serving to mount the specific support means for the respective fixture. The members S are vertical members, e.g., of the frame of a pre-fabricated so-called plumbing wall, to which plate P is welded, or stud-like members or other within-the-wall members with P rigidly secured thereto; the plane of the plate P, in other words its front face, being parallel to the desired final wall finish surface on which the fixture will be installed. Plate P may be typically a ¼ inch steel plate, six inches high and corresponding in length to the installation span of the fixture array to be installed.

Each assembly (see also FIG. 2) comprises a front or bracket plate C, a rear plate R, and upper and lower integral washer type hex head clamping bolts B, passed through upper and lower bracket casting apertures into respective aligned threaded apertures in the rear plate R to clamp on the support plate P sandwiched therebetween at a selected location.

The rear plate is simply a somewhat elongated rectangular steel plate, say ¼ inch steel plate, with the threaded apertures symmetrically located, i.e., located on the vertical center line equi-spaced from each end.

Front bracket plate C (see FIGS. 2 and 3) is preferably a grey iron casting for which, despite the asymmetry apparent in FIG. 3, right and left hand forms are not required even for aesthetic reasons, since concealed in the finished wall. The basic casting C (see FIG. 3), in outline roughly vertically oblong with top end somewhat rounded and bottom end obliquely sloping, through an integral rearward projection 11 at the top region of its flat back, has bearing support on the top edge of plate P to transmit loading directly to the support plate, hence wall structure, so that the top clamp bolt is not put in shear. For convenience of description, the casting may also be considered as a flat plate having on its front face ribs or pads, as thicker regions, as hereinafter described.

On the bracket front face, integral side marginal ribs 12, 13 run up from a bottom pad or thickened bottom portion 15 to round about the top corners and terminate in sloped ends on opposite sides of the top clamp bolt aperture 14. Aperture 14 here is about three-quarters round and also opens upwardly through the casting top edge. A flat relieved region 16 surrounding the aperture 14, and a similar but more irregular relieved region 17 surrounding the lower somewhat horizontally elongated bolt aperture 18, and also extending well down on the casting portion extending below aperture 18, provide flat bearing surfaces for the clamp bolt heads, and some wrench clearance to surrounding formations. The bolt apertures 14 and 18 expand toward the front, facilitating pattern removal in the foundry, and also affording bolt-insertion guide formations; and of course, are vertically spaced to clear plate P.

Between the clamp bolt apertures, a large flat pad area 20 is relieved somewhat below the marginal ribs, while a smaller rounder pad 21 is formed inward of, connecting to and at the same height as rib 13, offset to the right of aperture 18, the bottom thickening or pad 15 being carried over below 21. In the bottom thick region end or pad 15, the large aperture 22 is located on a common vertical centerline with 14 and 18. All the aforedescribed structure is formed in plate C as cast.

The bracket casting plate C requires at least one threaded aperture to be furnished therein to receive threaded mounting means anchoring a fixture support element thereon. Thus the aperture 22 may be threaded as with a female pipe thread or straight thread to receive a pipe-nipple-like sleeve 30 (see FIG. 2) screwed therein and secured by lock nut 33; the sleeve 30, in a known arrangement axially adjustably receiving, and by set screws 32 securing, the end 31a of a fragmentarily shown concealed type lavatory carrier arm 31.

The pad area 20 affords an extended flat area and fair bolt purchase depth where say three bolt holes 24, shown dashed in FIG. 3 may be drilled and tapped for anchoring mounting bolts 34 of a hanger type sink or lavatory support element 35, as shown in FIG. 4, with base accommodated on the flat area 20.

The small rounded pad 21 and the lower corner extension of the bottom pad 15 similarly provide regions where a pair of vertically spaced stud bolt holes 26 (dashed in FIG. 3) may be drilled and tapped for studs 37 mounting an exposed type carrier arm 38 as shown in FIG. 5.

The bracket casting assembly then may, for example, accommodate and provide an anchor base for concealed or exposed arm structures of types shown in Morris U.S. Pat. No. 2,903,712 or Kurtz U.S. Pat. No. 2,264,082, or for a hanger type of support, as in Brown U.S. Pat. No. 2,251,657.

The casting in plate C provides with economy of metal and in small compass a sturdy basic bracket structure flexible in application for the mounting of diverse lavatory fixture supports in a bracket assembly which is easily mounted in the plate P, the tapering clamp bolt apertures providing not only for ready pattern withdrawal in the foundry, but also bolt insertion guidance; and the integrally cast, plate-edge-engaging interrupted lip 11, extending horizontally to each side of the bolt hole 14 also stabilizing the element C in assembly. The assemblies after loose positioning on plate P are readily slid to and clamped at precise location by tightening bolts B; the span of the interrupted lip also stabilizing the assembly in vertical orientation facilitate the precision locating operation.

What is claimed is:

1. A plumbing or sanitary fixture carrier mounting system comprising, a horizontally elongated rigid support plate rigidly incorporated in a wall structure, parallel to the plane of the intended wall finish surface, and a pair of carrier mounting bracket assemblies adapted to be attached on and in position continuously horizontally adjustable along said support plate each said assembly comprising:

a bracket plate having a top aperture and a second aperture spaced therefrom downwardly toward the bottom;

a rear clamp plate having therethrough vertically spaced apertures respectively aligned with said apertures of the bracket plate; and top and bottom clamping bolts engageable in respective aligned apertures, whereby said clamp plate and bracket plate may co-operatively clamp upon a said support plate sandwiched therebetween intermediate said bolts;

said bracket plate comprising a vertically elongated bracket casting with a generally flat back region between said top and second apertures and with these apertures integrally cast therein, said region providing a back face engageable with a said support plate, said back region having integral lip means projecting beyond the back face and engageable with a top longitudinal edge of a said support plate and positioning the bracket plate with the top bolt clearing said support plate for relieving a top clamping bolt from shearing bearing on the support plate and steadying said bracket plate upon assembling with said rear plate and clamping bolts;

said bracket plate casting having at least one further aperture threaded for anchoring engagement with threaded lavatory support mounting means;

said casting in a downwardly extending portion below said second aperture having a non-relieved region with an aperture therein adapted to be through-threaded for receiving a nipple-like carrier arm mounting sleeve;

said downwardly extending portion having regions offset to one side of and respectively above and below the last mentioned aperture, adapted for tapping to receive mounting studs for an exposed type lavatory carrier arm.

2. A fixture carrier mounting system as described in claim 1, wherein in each said assembly
said rear clamp plate has the apertures thereof threaded to receive said clamping bolts.

3. A fixture carrier mounting system as described in claim 1, wherein in each said casting said bracket plate comprises a bracket casting having said top and second apertures integrally cast therein, and said projection said lip means is an interrupted lip extending away from both sides of the top aperture; said top and second aperture expanding toward the front of the casting to facilitate bolt insertion, and each surounded by a flat relieved clamping bolt head bearing and accepting region.

4. A fixture carrier mounting system, as described in claim 1, wherein in each said casting
said portion extending below said second aperture thereof is thickened to provide a region having the third bracket aperture therethrough and through threaded to receive a nipple-like carrier mounting sleeve.

5. A fixture carrier mounting system as described in claim 4, wherein
each said bracket casting has thickened regions offset to one side of and respectively above and below said third aperture thereof and each said thickened region having respective threaded apertures to receive mounting studs for an exposed type lavatory carrier arm.

6. A fixture carrier mounting system as described in claim 1, wherein
each said bracket casting has, intermediate said top and second apertures thereof, a flat front region provided with a plurality of tapped apertures for mounting bolts securing a lavatory hanger element against said flat front region.

7. A fixture carrier mounting system as described in claim 1,,
wherein each said casting has intermediate said top and second apertures thereof a relieved flat front region adapted for tapping with a plurality of mounting bolt receiving apertures for mounting a lavatory hanger element on the front of said casting;
the front of each said casting having around each of said first and second apertures thereof a relieved, flat clamping-bolt-head bearing and clearance area.

8. A fixture carrier mounting system as described in claim 1, comprising a plurality of pairs of said assemblies in combination with the said support plate, whereby the assemblies in each pair are continuously adjustable in horizontal spacing relative to each other as required to accommodate lavatory mounting means for a respective lavatory fixture, and the pairs are continuously horizontally adjustable relative to each other as required for the desired spacing of lavatory fixtures relative to each other along the said wall.

* * * * *